US007357252B2

(12) United States Patent  
Franks

(10) Patent No.: US 7,357,252 B2  
(45) Date of Patent: Apr. 15, 2008

(54) PROTECTIVE DEVICE FOR SPOOLED AND/OR REELED MATERIALS

(76) Inventor: Ronald Franks, 85 Alize Dr., Kinnelon, NJ (US) 07405

( * ) Notice: Subject to any disclaimer, the term of this patent is extended or adjusted under 35 U.S.C. 154(b) by 188 days.

(21) Appl. No.: 10/908,507

(22) Filed: May 15, 2005

(65) Prior Publication Data

US 2006/0254941 A1 Nov. 16, 2006

(51) Int. Cl.
*B65D 85/00* (2006.01)
*B65B 11/00* (2006.01)
*B65H 18/28* (2006.01)

(52) U.S. Cl. .................. 206/400; 53/409; 206/410; 242/159

(58) Field of Classification Search ........ 206/398–400, 206/410, 459.5, 401–402; 242/159–160.4, 242/170; 53/399, 409
See application file for complete search history.

(56) References Cited

U.S. PATENT DOCUMENTS

| | | | | |
|---|---|---|---|---|
| 1,646,593 A | * | 10/1927 | Peterson | 206/400 |
| 1,873,618 A | * | 8/1932 | Miller | 206/400 |
| 2,045,652 A | * | 6/1936 | Hopkins | 206/398 |
| 2,105,367 A | * | 1/1938 | Parsons | 206/459.5 |
| 2,555,840 A | * | 6/1951 | Bennett et al. | 206/400 |
| 3,195,722 A | * | 7/1965 | Hubert | 206/400 |
| 4,813,540 A | * | 3/1989 | Barnell et al. | 206/400 |
| 4,860,893 A | * | 8/1989 | Kaufman | 206/410 |

\* cited by examiner

*Primary Examiner*—Bryon P. Gehman
(74) *Attorney, Agent, or Firm*—Brosemer, Kolefas & Associates LLC

(57) ABSTRACT

A reusable device for protecting spooled materials such as wire, cable, fiber or others during their transport, storage, and warehousing. The device is wrapped circumferentially around the spooled material, secured, and is sufficiently impact resistant to prevent unintended damage to the spooled material. Keepers, disposed lengthwise along the device, serve to prevent the spooled material from becoming unwound along the ends of the spool. An external surface provides a surface for advertising or other written information.

16 Claims, 3 Drawing Sheets

Side View

Top View

PROTECTIVE DEVICE FOR SPOOLED AND/OR REELED MATERIALS

FIELD OF THE INVENTION

This invention relates generally to spooled and/or reeled materials. More particularly, it relates to a device for protecting spooled and/or reeled materials during their transport, or storage.

BACKGROUND OF THE INVENTION

A wide variety of commonly encountered, commercially important products are either produced, provided, transported, or stored on reels or spools. Such products include (but are not inclusive of) wire, cable, optical fiber, rope or cord and other materials that are suitably flexible to be wound onto a spool. Given their economic significance and pervasiveness, minimizing unintentional damage to spooled products during their transport and storage is of critical importance.

This importance of minimizing and/or eliminating unintentional damage to spooled products is difficult to overstate. In particular, certain spooled products—such as the fine wire used in wire-bonding applications—are essential to the reliable, speedy manufacture of high-performance integrated circuits. For those unfamiliar with wire-bonding, it typically involves the attachment of a very fine wire, usually less than 3 mils in diameter, from one connection pad to another thereby completing an electrical connection in an electronic device. If one considers that according to recent literature, $4 \times 10^{12}$ wires are bonded every year in the world and most are used in the approximately 40 to 50 BILLION integrated circuits (IC) produced, one can quickly appreciate that high-quality spools of wire-bonding wire is of profound economic importance.

Unfortunately however, spools of wire-bonding wire oftentimes include damaged sections of wire which—when used in a contemporary manufacturing process—breaks or otherwise becomes unusable such that the entire spool must be changed. In a high capacity, high volume IC production line, unintended or unexpected downtime due to damaged spools of wire is quite undesirable and possibly calamitous.

The origin of such damage to spooled materials is readily understood. In particular, a spool is constructed as a cylinder having an edge or rim at each end and an axial hole for a pin or a spindle, on which is wound the flexible material such as wire, cable or fiber. Due to their shape, spools of material may roll and shift during transportation. And since such spools tend to be heavy, if the rolling or shifting results in one spool striking another, then damage to the spooled material may result. More insidious, the damage may not be apparent by inspection.

Attempts to remedy the rolling or shifting spools typically involve securing spools of material to pallets or other platforms. The "palletized" spools are then moved by forklift or other mechanized methods. These methods too, have unfortunately failed to completely protect the spooled materials from becoming damaged. Damage from forklifts or other pallets are commonplace, and as before such damage may go undetected until a spool of material is subsequently used.

Consequently, methods and apparatus that prevent the damage to spooled materials during their transport and storage would represent a significant advance in the art.

SUMMARY OF THE INVENTION

The above problems are solved and an advance is made in the art according to my present invention which provides a protective device for spooled and/or reeled materials during their transport and storage.

Viewed from a first aspect, my inventive device is directed to an impact-resistant flexible "belt", which is circumferentially wrapped around the spooled material and secured. If an impact occurs during shipment or storage of the spooled material, the impact is suitably absorbed or otherwise dissipated by the belt, thereby preventing damage to the underlying spooled material.

Viewed from yet another aspect, my inventive device includes an outer surface which provides a surface suitable for providing, for example, advertising or other written information about the spooled material.

Further features and aspects of the invention will become apparent with reference to the accompanying drawing and illustrative detailed description.

DETAILED DESCRIPTION

Figure 1:
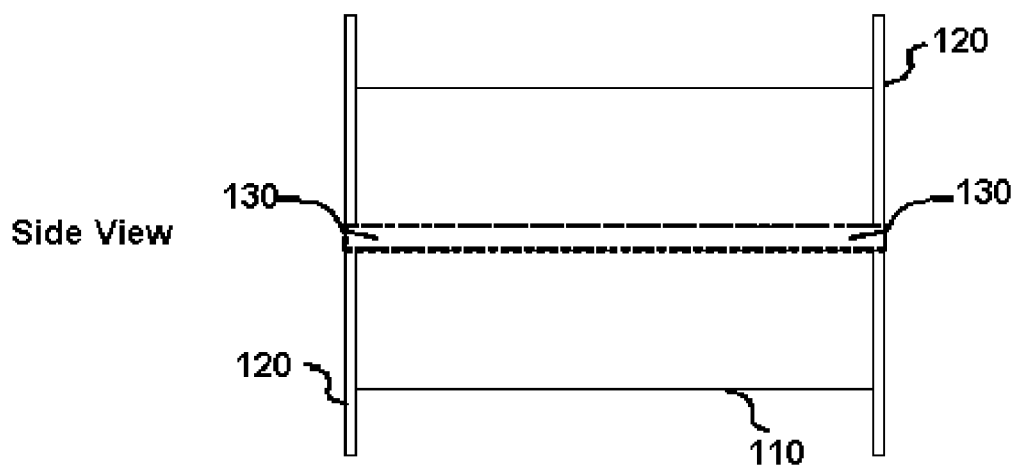
FIG. 1 is a diagram of a spool or reel of material showing both side, and top views.
Figure 1:
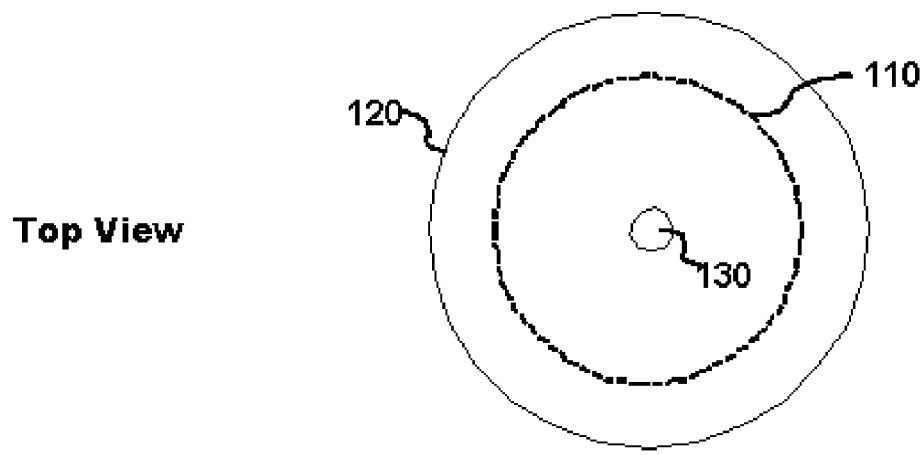

With reference to FIG. 1, there is shown a diagram of a representative spool 100 that is commonly encountered in any of a number of commercial applications. As can be appreciated, such spools are frequently used to transport, store and dispense a variety of flexible materials that are capable of being wound around such spools, including wire, cable, and optical fiber, among others.

The spool 100, shown in FIG. 1, includes a cylinder 110, around which is wound a flexible material such as wire, cable, etc (not shown), and ends 120, which are typically circular in shape, perpendicular to the axis of the cylinder 110 yet parallel to one another, thereby containing any material wound around the cylinder 110. Axial holes 130, within the ends 120, are axially aligned with cylinder 110.

As can be readily appreciated, the structure of a spool such as that shown in FIG. 1 enhances its utility. For example, the circular ends 120 generally provide a stable base such that when a spool of material is positioned upright—that is one of the circular ends 120 is positioned downward and the other end 120 is positioned upward—the spool of material is relatively stable and immune to unintended movement. (Unless, of course, some sufficient force is externally applied to the spool such as during transport). Additionally, and due to the planar nature of the ends 120, multiple spools may be stacked on top of one another, end-to-end, without compressing any spooled material wound around the cylinder 110. Furthermore, the round shape of the ends 120, facilitate the movement of a heavy spool of material since a spool positioned such that the cylinder 110 is horizontal, is readily rolled on its two ends 120. Lastly, the axial holes 130 permit the insertion of an axial rod (not shown) which allows the spooled material to be readily unwound when pulled thereby facilitating dispensing of the wound, spooled material.

To a certain extent, aspects of these noted utilities of a spool promote the damage of materials wound around the spool. In particular, when spools of material are rolled, ends of the rolling spool(s) sometimes contact the wound material on other spools, thereby damaging the contacted material.

Additionally, the material on a rolling spool may become damaged as well if it experiences an impact with another object.

It should be noted that while I have generally used the term "spool" to describe the structure depicted in FIG. 1, other terms such as "reel" and/or "bobbin" may be used in certain circumstances to describe such structures. Accordingly, structures having a generally cylindrical core around which is wound a sufficiently flexible material, and end pieces—perpendicularly attached to the core—will be applicable to my inventive teachings.

Figure 2:
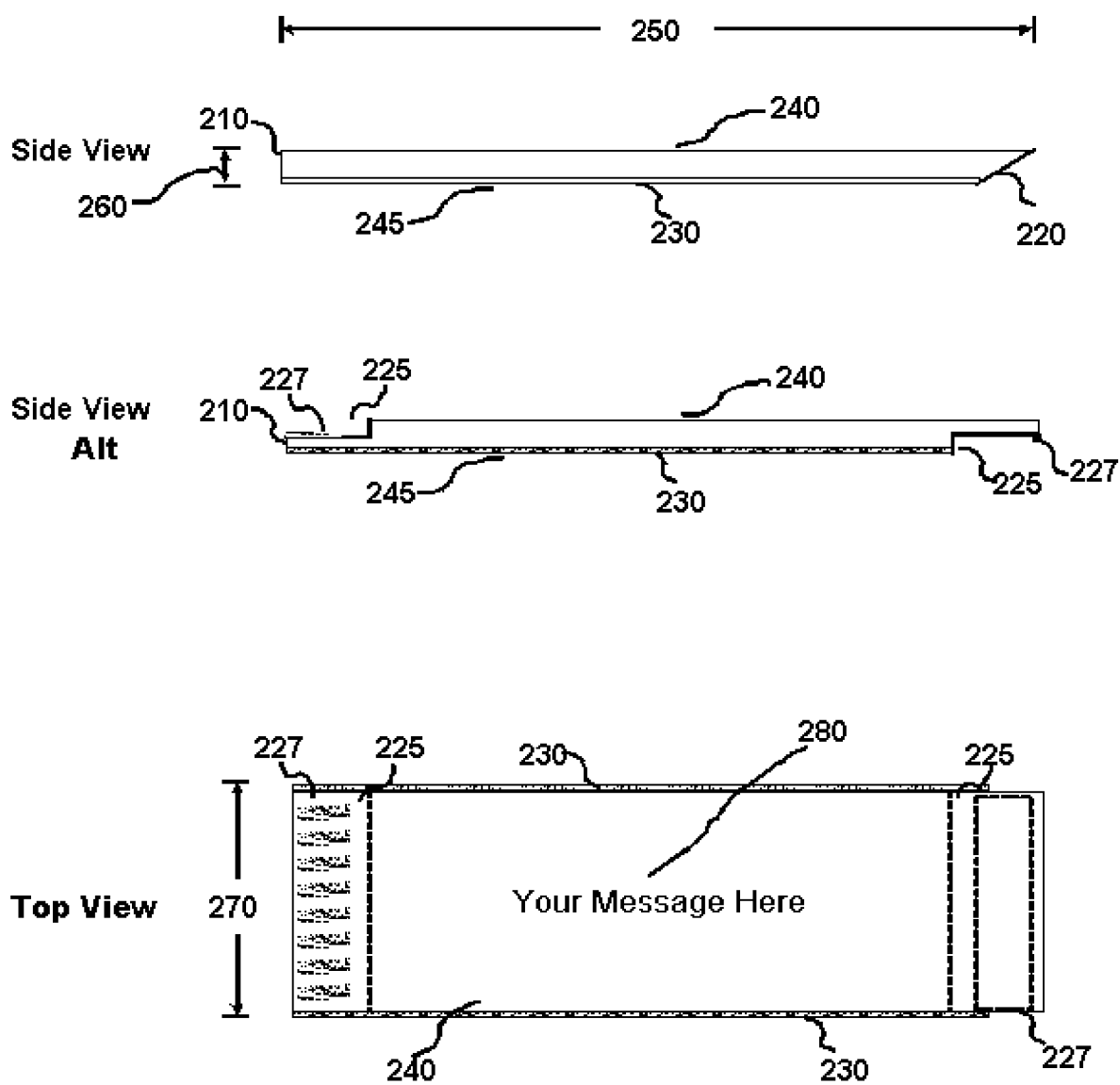
FIG. 2 is a diagram of my inventive protective device showing side, alt-side, and top view(s)

Turning now to FIG. 2, there is shown a number of views of my inventive protective device for spooled materials. In particular, and with reference to the side view, once can observe that my inventive device comprises an elongated body 210 having an outer surface 240, an inner surface 245 and a keeper 230, disposed along the length of the sides of the body 210. When the body 210 of the device is circumferentially wrapped around a spool of material such that the inner surface 245 of the device faces the spooled material and the outer surface 240 faces outward, the body 210 of the device provides a protective layer overlying the spooled material.

Preferably, the body 210 of the protective device is constructed from materials that are lightweight, impact resistant, and sufficiently flexible to wrap completely around a spool of material. A variety of known materials exist that exhibit these characteristics, however flexible plastic materials such as polyethylene or polypropylene are particularly attractive materials from which to construct the body.

Although not specifically shown in the views depicted in FIG. 2, when my inventive device is wrapped around a spool of material as described above, keepers 230 disposed along the length of both sides of body 210, serve to retain or "keep" the spooled material from becoming dislodged from the spool. These keepers 230, fill any void that exists between the sides of body 210, and the ends of the spool (120 in FIG. 1) when the device is wrapped around a spool of material. Suitable materials for the keepers 230 include lightweight, flexible plastics, rubber, or other, felt-like materials including both natural and synthetic.

As can be appreciated, the length 250 of the device is dependent upon the size of the spool around which it is wrapped. Generally, the length 250 must be such that the entire circumference of the spooled material is covered by the body 210. The thickness 260 of the body is likewise variable; however it must be sufficiently thick to provide an adequate resistance to likely impacts, such as other rolled spools of material or the occasional "stick" by a forklift or other items. And while it must be sufficiently thick to resist impact and protect the underlying spooled material, it must also be sufficiently lightweight and flexible to bend completely around the circumference of a spool. For particular plastics, a thickness of few-thousandths of an inch (0.001), up to a half-inch (0.5) will suffice for a range of spooled materials.

Shown further in FIG. 2 is end taper 220, which minimize the thickness of any overlapped body, which may occur if the body length is greater than the circumference of the spooled material. Having an end taper 220 such as that shown, permits slight overlap while minimizing the thickness at the overlap point, which may be a "pressure point" on underlying spooled material.

Alternatively, and with reference now to the alternate side view depicted in FIG. 2, the end taper 220 is replaced by notch overlap, 225, which provides a "lap" when the body 210 is wrapped around a spool of material. When the inventive device incorporates such notch overlaps 225, on one or both sides, an improved overlap region is produced. Additionally, such overlap regions (both notch and taper) provide a convenient point to secure the wrapped device to the spooled materials. Accordingly, and as can be readily appreciated by those skilled in the art, known methods of securing the overlapped ends of the body may be accomplished by adhesives, snaps, buckles, or hook-and-loop type fasteners 227. The choice(s) of which particular method or means of securing the ends of the device together are, of course, a matter of design choice for the particular application. Preferably, the securing method should provide for easy removal and reuse of the protective device.

Finally, turning to the top view of FIG. 2, shown is yet another inventive aspect of my device namely a top (or outer) surface 240 which provides a convenient surface on which to provide advertising or other written information. As noted before, spools of material are oftentimes stored in an "upright" position such that they do not roll around. Additionally, stacks of spools, all in an upright position are oftentimes used in warehousing or storage situations. As such, information that was provided on ends of the spools, were unreadable as it was hidden by the stacked spools. With my inventive protective devices, advertising, or other informational writing is visible around the circumference of a wrapped spool of material, regardless of end position.

As noted, plastics materials such a polyethylene or polypropylene are attractive because of their lightweight, flexibility and impact resistance. Unfortunately, they are oftentimes difficult to mark, due in part to their chemical resistivity. Accordingly, a writable surface may be laminated or otherwise applied to the outer surface of the body, thereby providing a suitable writing surface.

Figure 3:
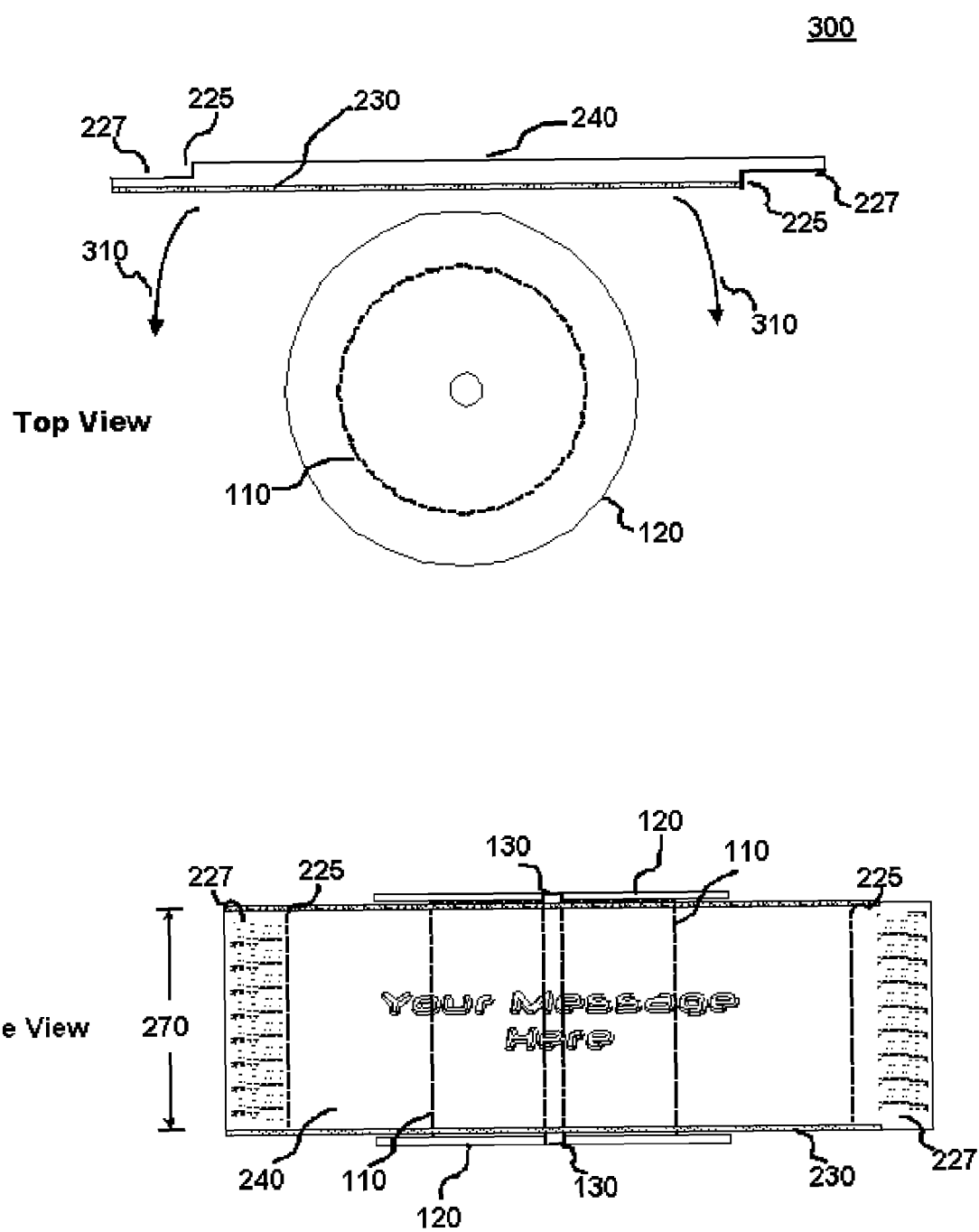
FIG. 3 is a diagram of my inventive protective device as it is applied to a spool or reel of material, in both top and side view(s).

Turning our attention now to FIG. 3, there is shown top and side view(s) of my protective device as applied to a spool of material. More particularly, the top view shows that the protective device 300, is wrapped circumferentially around the spool 110 as indicated by arrows 310, where it is secured in place by fastener(s), 227, positioned preferably in notched region(s) formed at opposite ends of the device body.

Finally, the side view of FIG. 3 shows the relationship between my inventive device when positioned within the ends 120 of a spool 110. As can be seen by inspecting this side view, the height 270 of the device is such that it (and its keepers 230) fits sufficiently snugly between the ends 120 of spool 110 thereby preventing the underlying spooled material from becoming dislodged. In this manner, the keepers 230 provide a "seal" between the body of my inventive device and the ends 120 of the spool 110.

Of course, it will be understood by those skilled in the art that the foregoing is merely illustrative of the principles of this invention, and that various modifications can be made by those skilled in the art without departing from the scope and spirit of the invention, which shall be limited by the scope of the claims appended hereto.

What is claimed is:

1. A protective device for protecting spooled materials, said device comprising:
    an elongated body having an inner surface, an outer surface, a top and a bottom edge, and opposite ends, wherein the thickness of said body is substantially tapered near the said opposite ends;
    a first keeper and a second keeper respectively disposed lengthwise along the top and bottom edges of the body, wherein said keepers are constructed from a different material than the material from which said body is constructed; and a first part and a second complementary part of a fastener mechanism disposed respectively at the opposite ends;

such that when the protective device is wrapped circumferentially around a spool of material and subsequently fastened in position, the inner surface faces inward toward the spooled material, the outer surface faces outward, the keepers are within the axial ends of the spool, and the fastener mechanism secures the overall device in position.

2. The device according to claim 1, wherein the elongated body of the device is constructed from a flexible, impact resistant plastic material.

3. The device according to claim 1, wherein the fastener mechanism is a hook-and-loop fastener.

4. The device according to claim 1 wherein the fastener mechanism is a chemical adhesive.

5. The device according to claim 1 further comprising:

lap regions, formed at each of the ends, of substantially lower thickness than the nominal thickness of the elongated body, such that when the device is circumferentially wrapped around a spool of material, the lap regions at each end of the body overlap one another and the resulting combined nominal thickness of the overlapping regions combined, is substantially the same as the nominal thickness of the elongated body.

6. The device according to claim 5 wherein the complementary parts of the fastener mechanism are affixed to the lap regions.

7. The device according to claim 1 wherein the keepers are constructed from a material exhibiting different flexibility and impact resistance than the material from which said body is constructed.

8. The device according to claim 1 wherein the outer surface includes printed information, said information selected from a group consisting of advertising, and other product information, such that when the device is wrapped circumferentially around a spool of material, the printed information is visible.

9. A protective device for protecting material wound around a spool, the spool comprising:

a cylindrical hub; and end pieces, each end piece affixed at the opposite axial ends of the cylindrical hub, wherein the end pieces being affixed parallel to one another and perpendicular to the axis of the cylindrical hub; and said protective device comprising:

an elongated body constructed from a sufficiently lightweight, flexible, impact resistant material, said body defining a body internal surface and an opposed body external surface, said body having opposed free ends carrying complementary parts of a fastener mechanism, wherein the thickness of said body is substantially tapered near said ends, said body having opposed top and bottom edges having a first keeper and a second keeper respectively affixed along the length of each edge, wherein said keepers are constructed from a different material than the material from which said body is constructed;

such that when the protective device is circumferentially wrapped around the material wound around said spool, the complementary parts of the fastener secure it in place, and the keepers substantially fill any voids between the body of the device and the end pieces of the spool.

10. The device according to claim 9 wherein the fastener mechanism is a hook and loop fastener.

11. The device according to claim 9 wherein the body external surface includes a printed information, said information selected from a group consisting of advertising and other product information.

12. The device according to claim 9, wherein the keepers comprise a material exhibiting different flexibility and impact resistance than the material from which the said body is constructed, thereby substantially filling any voids between the body of the device and the end pieces of the spool, said keeper material selected from a group consisting of lightweight flexible plastic, rubber, and natural and synthetic felt material.

13. The device according to claim 9 wherein said ends include overlap regions.

14. The protective device of claim 1, wherein the elongated body is substantially rectangular in shape.

15. A method of protecting material wound around a spool having a cylindrical hub and opposing end pieces affixed parallel to one another at the opposite axial ends of the hub, said method comprising the steps of:

wrapping a protective device circumferentially around the material wound around said spool, said protective device comprising an elongated body including opposing top and bottom edges, and opposing free ends wherein the thickness of said body is substantially tapered at said ends;

keeping the protective device between the opposing end pieces of the spool by a first keeper and a second keeper affixed respectively along the length of each edge of the elongated body, said keepers constructed from a material exhibiting different flexibility and impact resistance than the material from which the elongated body is constructed; and securing the protective device wrapped around the material by fastening a pair of complementary fasteners attached to said opposing free ends of the protective device, such that the keepers substantially fill any space between the elongated body of the protective device and the end pieces of said spool, and the fasteners secure the protective device in place around the material wound on said spool.

16. The method of claim 15, wherein said wrapping of the protective device includes a step of overlapping said ends having tapered thickness, such that the combined nominal thickness of the overlapping regions combined, is substantially the same as the nominal thickness of the elongated body of the protective device.

* * * * *